United States Patent
Song

(10) Patent No.: US 9,961,322 B2
(45) Date of Patent: May 1, 2018

(54) APPARATUS AND METHOD FOR ELIMINATING NOISE IN STEREO IMAGE

(71) Applicant: LG INNOTEK CO., LTD., Seoul (KR)

(72) Inventor: In Hyuk Song, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 214 days.

(21) Appl. No.: 14/360,889

(22) PCT Filed: Nov. 5, 2012

(86) PCT No.: PCT/KR2012/009245
§ 371 (c)(1),
(2) Date: May 27, 2014

(87) PCT Pub. No.: WO2013/085148
PCT Pub. Date: Jun. 13, 2013

(65) Prior Publication Data
US 2014/0300706 A1 Oct. 9, 2014

(30) Foreign Application Priority Data
Dec. 9, 2011 (KR) .................. 10-2011-0131659

(51) Int. Cl.
*H04N 13/02* (2006.01)
*H04N 13/00* (2006.01)

(52) U.S. Cl.
CPC ..... *H04N 13/0022* (2013.01); *H04N 13/0239* (2013.01); *H04N 13/0246* (2013.01); *H04N 2213/003* (2013.01)

(58) Field of Classification Search
CPC .......... H04N 13/0246; H04N 13/0018; H04N 13/0022; H04N 13/0239; H04N 2213/003
(Continued)

(56) References Cited

U.S. PATENT DOCUMENTS 6,191,809 B1* 2/2001 Hori .................. A61B 1/00193
348/45
7,209,161 B2* 4/2007 Thal .................... G03B 35/08
348/187
(Continued)

FOREIGN PATENT DOCUMENTS

EP         2393298 A1     12/2011
KR    2007-0063063 A      6/2007
(Continued)

OTHER PUBLICATIONS

International Search Report in International Application No. PCT/KR2012/009245, filed Nov. 5, 2012.
(Continued)

*Primary Examiner* — Nathnael Aynalem
(74) *Attorney, Agent, or Firm* — Saliwanchik, Lloyd & Eisenschenk

(57) ABSTRACT

Apparatus and method for eliminating noise in stereo image are disclosed, the method according to an exemplary embodiment of the present invention comprising, obtaining a first image captured by a first sensor unit and a second imaged captured by a second sensor unit; calculating a pixel difference of the second image relative to a first image based on a predetermined reference point; determining a pixel amount of the second image to be calibrated using a reference pixel difference and the pixel difference; and generating a driving signal for driving an Optical Image Stabilizer (OIS) actuator using the pixel amount to be calibrated.

6 Claims, 3 Drawing Sheets

(58) Field of Classification Search
USPC ...................................... 348/42–55; 382/154
See application file for complete search history.

(56) References Cited

U.S. PATENT DOCUMENTS

| | | | |
|---|---|---|---|
| 2002/0018120 A1* | 2/2002 | Kogure | ................. B60Q 9/008 |
| | | | 348/148 |
| 2004/0062434 A1 | 4/2004 | Tsuyuki et al. | |
| 2007/0165942 A1* | 7/2007 | Jin | ..................... H04N 13/0018 |
| | | | 382/154 |
| 2009/0022393 A1 | 1/2009 | Bar-Zohar et al. | |
| 2010/0225745 A1* | 9/2010 | Chen | ................... H04N 13/021 |
| | | | 348/49 |
| 2011/0069151 A1* | 3/2011 | Orimoto | ................ G03B 35/00 |
| | | | 348/42 |

FOREIGN PATENT DOCUMENTS

| | | |
|---|---|---|
| KR | 10-2008-0085044 A | 9/2008 |
| WO | WO-2011/114683 A1 | 9/2011 |

OTHER PUBLICATIONS

Office Action dated Jun. 7, 2016 in Taiwanese Application No. 101142840.
Office Action dated Aug. 21, 2017 in Korean Application No. 10-2011-0131659.

\* cited by examiner

[Fig. 1a]
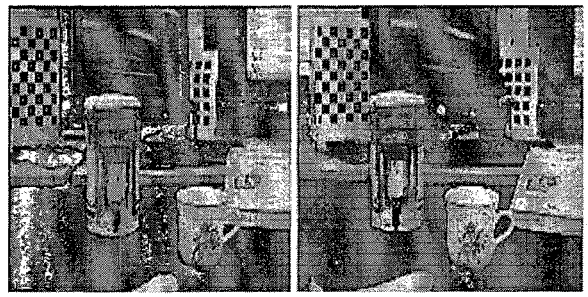
LEFT IMAGE      RIGHT IMAGE
[Fig. 1b]
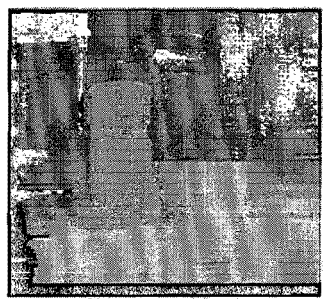
[Fig. 2]
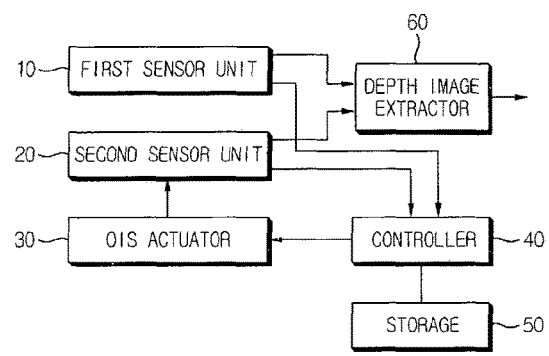
[Fig. 3a]
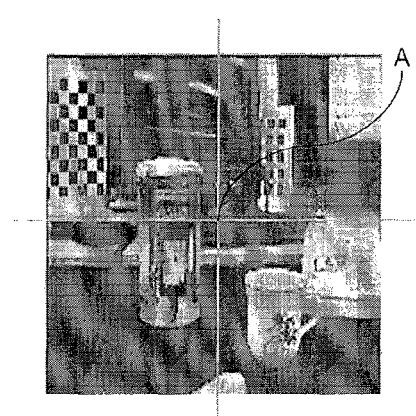

[Fig.3b]
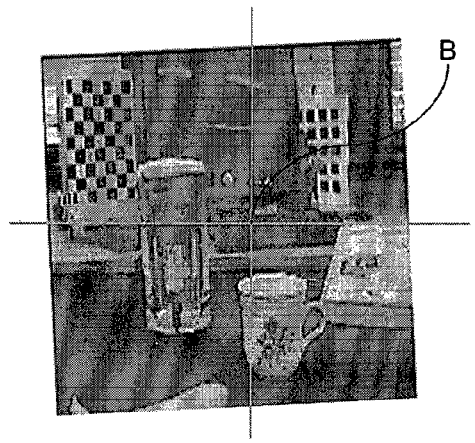
[Fig.4]
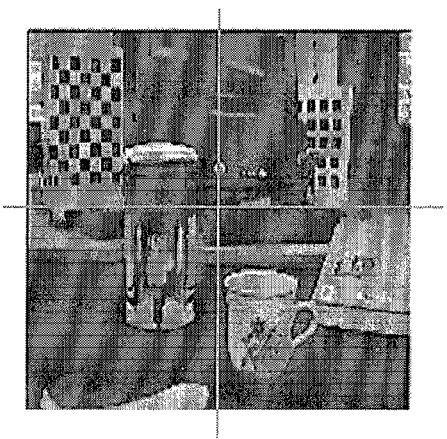

[Fig. 5]
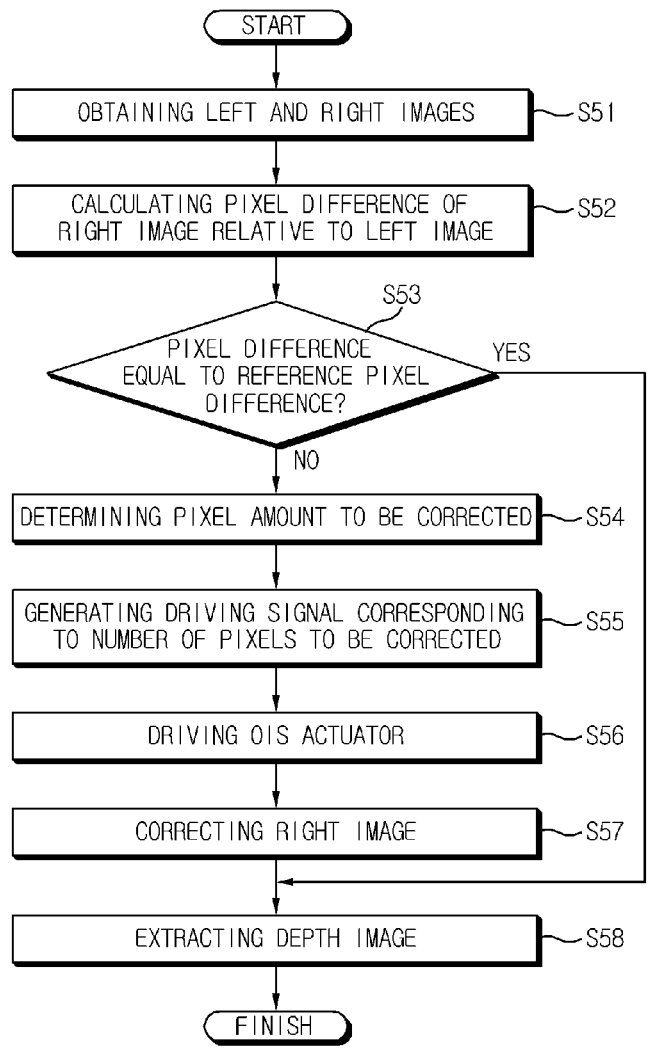

APPARATUS AND METHOD FOR ELIMINATING NOISE IN STEREO IMAGE

TECHNICAL FIELD

The exemplary and non-limiting embodiments of this invention generally relate to an apparatus and method for eliminating noise in stereo image.

BACKGROUND ART

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

Generally, stereo matching algorithm is a technique to create a disparity map by matching pixels from two images to estimate depth for objects in the scene. That is, the stereo matching algorithm is a technique to learn how far an object is distanced by matching of each pixel from a left image and a right image.

For example, in a case one finger is positioned between two eyes, and only left eye is opened, the finger is positioned only at a right side, and in a case only right eye is opened, the finger is positioned only at a left side. Meanwhile, in case of viewing a mountain peak at a far distance, the peak is positioned at a center regardless of a left eye being opened or a right eye being opened.

In a case an image is to be obtained using a stereo camera in the stereo matching algorithm, a position of an object captured by a camera is changed in response to a distance, and a depth image is extracted using this information.

What is important in designing this stereo camera is to align two sensors obtaining stereo image. A misalignment between the two sensors suffers from a disadvantage of generating a streaking noise in a depth image extracted from the stereo image.

FIG. 1a is an exemplary schematic view of a stereo image, and FIG. 1b is an exemplary schematic view of a depth image extracted from the stereo image of FIG. 1a. The stereo image (left image and right image) of FIG. 1a is a misaligned image, where a right image is misaligned relative to a left image to create a streaking noise in the depth image as shown in FIG. 1b.

That is, a conventional stereo system suffers from disadvantages in that a streaking noise is generated in a depth image by tilt or rotation between sensors obtaining stereo image to decrease image recognition rate.

Technical Problem

Accordingly, the present invention has been made keeping in mind the above disadvantages/problems occurring in the prior art, and the present invention is to provide an apparatus for eliminating noise in stereo image by applying an OIS (Optical Image Stabilizer) to a sensor unit of a stereo camera to correct another image relative to one image in the stereo image using the OIS, and a method using the apparatus.

Technical Solution

The below Technical Solution section is intended to be merely exemplary and non-limiting.

In one general aspect of the present invention, there is provided an apparatus for eliminating noise in stereo image, the apparatus comprising: storage storing a reference pixel difference between a first image captured by a first sensor unit and a second imaged captured by a second sensor unit; a controller generating a driving signal for driving an Optical Image Stabilizer (OIS) actuator by calculating a pixel difference of the second image relative to the first image based on a predetermined reference point to determine a pixel amount to be calibrated from the reference pixel difference; and the OIS actuator calibrating the second image in response to the driving signal.

In some exemplary embodiments, the apparatus may further comprise an extractor extracting a depth image using the first image and the calibrated second image.

In some exemplary embodiments, the OIS actuator may calibrate the second image by moving the second image as much as the pixel amount to be calibrated.

In some exemplary embodiments, the first and second sensor units may include Complementary Metal-Oxide Semiconductors (CMOS s).

In some exemplary embodiments, the first and second sensor units may include Charge Coupled Devices (CCDs).

In some exemplary embodiments, the reference pixel difference may be predetermined by a discrete distance between the first and second sensor units.

In another general aspect of the present invention, there is provided a method for eliminating noise in stereo image, the method comprising: obtaining a first image captured by a first sensor unit and a second imaged captured by a second sensor unit; calculating a pixel difference of the second image relative to a first image based on a predetermined reference point; determining a pixel amount of the second image to be calibrated using a reference pixel difference and the pixel difference; and generating a driving signal for driving an Optical Image Stabilizer (OIS) actuator using the pixel amount to be calibrated.

In some exemplary embodiments, the method may further comprise calibrating the second image in response to the driving signal.

In some exemplary embodiments, the method may further comprise extracting a depth image using the first image and the calibrated second image.

In some exemplary embodiments, the reference pixel difference may be predetermined by a discrete distance between the first and second sensor units.

Advantageous Effects

The apparatus and method for eliminating noise in stereo image according to the present invention has an advantageous effect in that a misalignment of stereo image can be minimized to minimize streaking noise, and a depth image of the stereo image can be clearly extracted by minimizing the streaking noise.

DESCRIPTION OF DRAWINGS

The teachings of the present invention can be readily understood by considering the following detailed description in conjunction with the accompanying drawings, in which:

FIG. 1a is an exemplary schematic view of a stereo image, and FIG. 1b is an exemplary schematic view of a depth image extracted from the stereo image of FIG. 1a;

FIG. 2 is a schematic block diagram illustrating an apparatus for eliminating noise in stereo image according to an exemplary embodiment of the present invention;

FIGS. 3a and 3b are schematic views illustrating images obtained by first and second sensor units of FIG. 2 according to an exemplary embodiment of the present invention;

FIG. 4 is a schematic view illustrating an image of FIG. 3b calibrated according to an exemplary embodiment of the present invention; and FIG. 5 is a flowchart illustrating a method for eliminating noise in stereo image according to an exemplary embodiment of the present invention.

BEST MODE

Hereinafter, exemplary embodiments of the present invention will be described in detail with reference to the accompanying drawings.

In describing the present invention, detailed descriptions of constructions or processes known in the art may be omitted to avoid obscuring appreciation of the invention by a person of ordinary skill in the art with unnecessary detail regarding such known constructions and functions. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Thus, the following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order.

Now, the apparatus and method for eliminating noise in stereo image according to the present invention will be described in detail with reference to the accompanying drawings.

FIG. 2 is a schematic block diagram illustrating an apparatus for eliminating noise in stereo image according to an exemplary embodiment of the present invention.

Referring to FIG. 2, the apparatus for eliminating noise in stereo image according to an exemplary embodiment of the present invention includes a first sensor unit (10), a second sensor unit (20), an Optical Image Stabilizer (OIS) actuator (30), a controller (40), storage (50) and a depth image extractor (60).

The first and second sensor units (10 and 20) are spaced apart at a predetermined distance to respectively obtain one of stereo image. For example, the first sensor unit (10) may obtain a left image, and the second sensor unit (20) may obtain a right image. Alternatively, the first sensor unit (10) may obtain a right image, and the second sensor unit (20) may obtain a left image. However, for convenience sake in the present invention, it is defined that the first sensor unit (10) obtains a left image, and the second sensor unit (20) obtains a right image.

Furthermore, explanation of an exemplary embodiment of the present invention is provided in such a manner that a position of a right image obtained by the second sensor unit (20) is changed based on a left image obtained by the first sensor unit (10). However, it should be apparent to the skilled in the art that a position of a left image obtained by the first sensor unit (10) is changed based on a right image obtained by the second sensor unit (20).

The first and second sensor units (10, 20) may be, for example, Complementary Metal-Oxide Semiconductors (CMOSs) and/or may be Charge Coupled Devices (CCDs). However, the present invention is not limited thereto, and the first and second sensor units (10, 20) may be other devices capable of performing similar functions.

The first and second sensor units (10, 20) are spaced apart at a predetermined distance, where the discrete distance is constant, such that it can be predetermined how far (how many pixels) the left image obtained by the first sensor unit (10) is distanced from the right image obtained by the second sensor unit (20), based on a predetermined reference point (hereinafter referred to as 'reference pixel difference'), and the distance may be stored in the storage (50). At this time, the reference point may be a center point of an image, for example.

FIGS. 3a and 3b are schematic views illustrating images obtained by first and second sensor units of FIG. 2 according to an exemplary embodiment of the present invention, where it is illustrated that the first sensor unit (10) obtains a left image and the second sensor unit (20) obtains a right image.

Referring to FIGS. 3a and 3b, the right image obtained by the second sensor unit (20), based on a center point (A) of the left image of the first sensor unit (10), must be basically moved in a center point (B) thereof as much as the number of pixels corresponding to the discrete distance, where the image is twisted due to misalignment as shown in FIG. 3b.

The controller (40) calculates a pixel difference of the right image obtained by the second sensor unit (20) relative to the left image obtained by the first sensor unit (10) to determine a pixel amount to be calibrated from the reference pixel difference stored in the storage (50). Furthermore, the controller (40) transmits to the OIS actuator (30) a driving signal for driving the OIS actuator (30) as much as a pixel amount to be calibrated.

The OIS actuator (30) receives the driving signal from the controller (40) to move the right image obtained by the second sensor unit (20) as much as the pixel amount to be calibrated and to calibrate the image.

FIG. 4 is a schematic view illustrating an image of FIG. 3b calibrated according to an exemplary embodiment of the present invention, where it can be noted that misalignment can be eliminated by calibrating an image by the OIS actuator (30) according to an exemplary embodiment of the present invention.

The depth image extractor (60) of FIG. 2 receives the left image from the first sensor unit (10) and receives the calibrated right image from the second sensor unit (20) to extract a depth image for stereo matching. An algorithm extracting a depth image is well known to the skilled in the art, such that no more detailed explanation thereto will be made herein.

MODE FOR INVENTION

FIG. 5 is a flowchart illustrating a method for eliminating noise in stereo image according to an exemplary embodiment of the present invention.

Referring to FIG. 5, in the method for eliminating noise in stereo image according to an exemplary embodiment of the present invention, a left image and a right image are obtained from the first and second sensor units (10 and 20) (S51). As explained in the above, it is exemplified that the first sensor unit (10) obtains a left image, and the second sensor unit (20) obtains a right image for convenience sake in the present invention. However, the present invention is not limited thereto.

Furthermore, although an exemplary embodiment of the present invention has based the left image obtained by the first sensor unit (10) as a reference image, it should be apparent to the skilled in the art that an image may be calibrated by changing a position of a left image obtained by the first sensor unit (10), based on a right image obtained by the second sensor unit (10), as explained in the foregoing.

The controller (40) calculates a pixel difference of the right image obtained by the second sensor unit (20) relative to a left image obtained by the first sensor unit (10) based on a predetermined reference point (S52). The storage (50) may be stored with a reference pixel difference corresponding to a discrete distance between the first and second sensor units (10 and 20).

Thus, the controller (40) determines whether the pixel difference calculated in S52 is equal to the reference pixel difference (S53). As a result of determination at S53, if it is determined that the pixel difference calculated in S52 is equal to the reference pixel difference, it means that the right image is correctly aligned relative to the left image which is a reference image. In this case, the depth image extractor (60) uses the left and right images to extract a depth image (S58).

As a result of determination at S53, if it is determined that the pixel difference calculated in S52 is not equal to the reference pixel difference, it means that the right image is misaligned relative to the left image which is the reference image. In this case, the controller (40) determines a pixel amount to be calibrated from the pixel difference obtained from S52 and from the reference pixel difference stored in the storage (50) (S54).

Furthermore, the controller (40) generates a driving signal for driving an OIS actuator (30) as much as the pixel amount to be calibrated (S55) and transmits the driving signal to the OIS actuator (30). The OIS actuator (30) is driven by the driving signal received from the controller (40) (S56), whereby the second sensor unit (20) can calibrate the right image obtained by the second sensor unit (20) (S57).

Successively, the depth image extractor (60) uses the left image obtained by the first sensor unit (10) and the right image obtained by the second sensor unit (20) and calibrated by the OIS actuator (30) to extract a depth image of stereo image (S58).

Meanwhile, the exemplary embodiments of the present invention may be embodied in the form of program code embodied in tangible media, such as magnetic recording media, optical recording media, solid state memory, floppy diskettes, CD-ROMs, hard drives, or any other non-transitory machine-readable storage medium. When the exemplary embodiments of the present disclosure are implemented using software, constituent means of the present invention may be code segments executing necessary processes. The programs or code segments may be also embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the disclosure.

The above-described embodiments of the present invention can also be embodied as computer readable codes/instructions/programs on a computer readable recording medium. Examples of the computer readable recording medium include storage media, such as magnetic storage media (for example, ROMs, floppy disks, hard disks, magnetic tapes, etc.), optical reading media (for example, CD-ROMs, DVDs, etc.), carrier waves (for example, transmission through the Internet) and the like. The computer readable recording medium can also be distributed over network coupled computer systems so that the computer readable code is stored and executed in a distributed fashion.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The apparatus and method for eliminating noise in stereo image according to the present invention has an industrial applicability in that a misalignment of stereo image can be minimized to minimize streaking noise, and a depth image of the stereo image can be clearly extracted by minimizing the streaking noise.

The invention claimed is:

1. An apparatus for eliminating noise in a stereo image, the apparatus comprising:
    storage that stores a reference pixel difference, wherein the reference pixel difference is defined as a number of pixels in a distance between a first reference image obtained by a first sensor unit and a second reference image obtained by a second sensor unit, based on a predetermined reference point, wherein the first sensor unit and the second sensor unit are spaced apart at a predetermined distance, and wherein the reference pixel difference is predetermined by a discrete distance between the first sensor unit and the second sensor unit;
    a controller that calculates a pixel difference of a first image obtained by the first sensor unit relative to a second image obtained by the second sensor unit, determines a pixel number of the first image to be calibrated based on a difference between the reference pixel difference and the calculated pixel difference, and transmits to an Optical Image Stabilizer (OIS) actuator a driving signal corresponding to the pixel number; and
    the OIS actuator that calibrates the first image in response to the driving signal, wherein the OIS actuator moves the first image obtained by the first sensor unit by the pixel number.

2. The apparatus of claim 1, further comprising an extractor that extracts a depth image based on the calibrated first image and the second image.

3. The apparatus of claim 1, wherein the first and second sensor units each includes Complementary Metal-Oxide Semiconductors (CMOSs).

4. The apparatus of claim 1, wherein the first and second sensor units each includes Charge Coupled Devices (CODs).

5. A method for eliminating noise in a stereo image, the method comprising:

storing a reference pixel difference, wherein the reference pixel difference is defined as a number of pixels in a distance between a first reference image obtained by a first sensor unit and a second reference image obtained by a second sensor unit, based on a predetermined reference point, wherein the first sensor unit and the second sensor unit are spaced apart at a predetermined distance, and wherein the reference pixel difference is predetermined by a discrete distance between the first sensor unit and the second sensor unit;

obtaining a first image captured by the first sensor unit and a second image captured by the second sensor unit;

calculating a pixel difference of the first image relative to the second image based on the predetermined reference point;

determining a pixel number of the first image to be calibrated based on a difference between the reference pixel difference and the calculated pixel difference;

transmitting to an Optical Image Stabilizer (OIS) actuator a driving signal corresponding to the pixel number; and calibrating the first image in response to the driving signal, wherein the OIS actuator moves the first image captured by the first sensor unit by the pixel number.

6. The method of claim 5, further comprising extracting a depth image based on the calibrated first image and the second image.

* * * * *